No. 777,900. PATENTED DEC. 20, 1904.
W. E. JENKINSON.
LOOSE LEAF BOOK.
APPLICATION FILED JAN. 14, 1903.
NO MODEL.
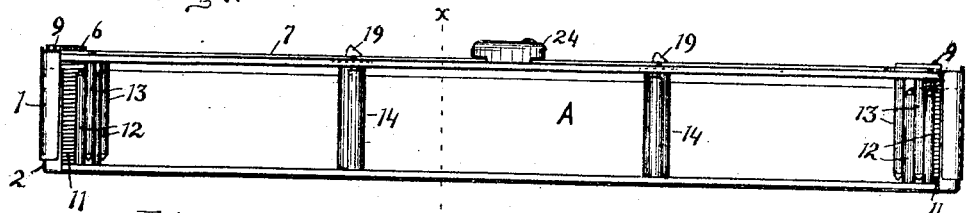
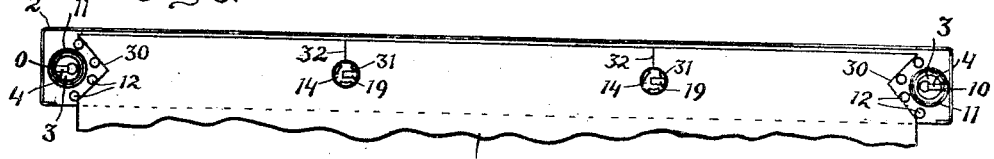
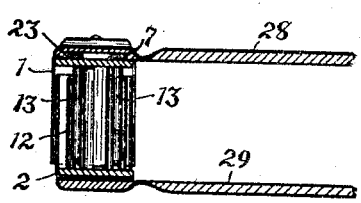
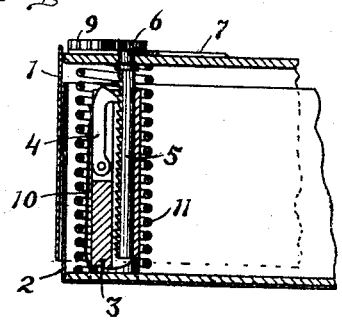
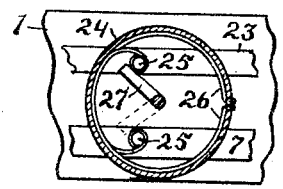
WITNESSES: William E. Jenkinson INVENTOR
BY
ATTORNEY No. 777,900. Patented December 20, 1904.

UNITED STATES PATENT OFFICE.

WILLIAM E. JENKINSON, OF FORT WAYNE, INDIANA.

LOOSE-LEAF BOOK.

SPECIFICATION forming part of Letters Patent No. 777,900, dated December 20, 1904.

Application filed January 14, 1903. Serial No. 138,965.

*To all whom it may concern:*

Be it known that I, WILLIAM E. JENKINSON, a citizen of the United States, residing at Fort Wayne, in the county of Allen and State of Indiana, have invented certain new and useful Improvements in Loose-Leaf Books; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in loose-leaf books; and the object of my improvement is to afford a lock for securing the leaves of loose-leaf books which will allow the removal of any one or all or any number of leaves at a time.

I accomplish my object by my construction illustrated in the accompanying drawings, in which—

Figure 1 is a longitudinal view showing the open side of my loose-leaf holder. Fig. 2 is a plan of the top of the holder, showing the arrangement of the actuating-bars. Fig. 3 is a plan of the lower portion of the holder. Fig. 4 is an enlarged view showing a cross-section through the holder and the attached covers on the line X X of Figs. 1 and 2. Fig. 5 is an enlarged detail, in longitudinal section, showing the locking device in one end of the holder. Fig. 6 is an enlarged detail plan showing the manner of operating the actuating-bars. Fig. 7 is a detail elevation showing one of the extensible guide-posts on an enlarged scale. Fig. 8 is a cross-section at Y Y of Fig. 7. Fig. 9 is a plan showing a plate for attachment on the guide-post, and Fig. 10 is a a detail elevation of the guide-post in a plane at right angles to that of Fig. 8.

Similar characters of reference indicate corresponding parts throughout the several views, and referring now to the same, 1 is the upper portion of the holder and is arranged to telescope the lower portion 2 of the holder, the two portions forming a case A, the one side of which is open to receive the leaves B. Secured in the said lower portion 2 near its ends are hollow posts 3. Each post 3 has a pawl 4 pivoted therein. The said upper portion 1 has near its ends toothed arbors 5, which extend through the top thereof, and pinions 6 6 are mounted upon their extending ends. A sliding bar 7, having bifurcated ends 8, is arranged upon the top of the portion 1, the said ends 8 ranging astride the arbors 5 beneath the pinions 6. Racks 9 are secured to the ends of the bar 7, which racks engage with the pinions 6, respectively, and drive the same when the said bar is moved lengthwise. In this manner the arbors are caused to turn. When the upper portion 1 is in place, the arbors 5 extend into the hollow posts 3, and the pawls 4 engage the teeth of the arbors 5 and prevent the withdrawal of the said arbors from said posts. Thus the portions 1 and 2 are locked together. Springs 10 are secured to the bottoms of the posts 3, and their upper ends rest against the backs of the pawls 4 and tend to hold the same into engagement with the teeth of the arbors. The said arbors are toothed only upon one side, and when in normal position the teeth are in line with said pawls, and when the arbors are turned the teeth are thereby disengaged from the pawls, and the arbors may then be withdrawn from the posts 3. Coiled springs 11 are interposed between the portions 1 and 2 and are arranged over the posts 3. The said springs tend to hold the portion 1 in its uppermost position. Pins 12 project upward from the bottom of the lower portion 2, and similar pins 13 depend from the top of the upper portion 1. The said pins 12 intervene the pins 13.

14 represents adjustable guide-posts mounted upon the lower portion 2 and consist each of two sections 15 and 16, the former being rigidly fixed to the lower portion 2 and the latter being vertically adjustable upon the section 15. The arms of the section 16 intervene the arms of the section 15 and are flush therewith, so that the diameter of the said sections is uniform throughout.

19 represents hooks rigidly fixed at the tops of the respective sections 16, and 17 represents guide-stems which are also rigidly fixed in said sections 16 and pass loosely through holes 18 in the tops of the sections 15, and their lower ends are rigidly connected with the lower inturned ends of the arms of the upper sections 16, as indicated by dotted lines in Fig. 7. Thus it will be understood that the upper sections are limited in their upward movements, because the lower ends of the guide-stems are thus connected, which will prevent them from being withdrawn through the holes 18.

A plate 20, having a slot 22, is attached to the top of the guide-post 14 by placing said plate astride the hook 19, with its slot 22 engaging in the recesses 21, made in the sides of said hook. The hooks 19 are adapted to extend through the upper portion 1 and become engaged by the bar 23, whereby they are locked in connection with said upper portion. Thus when said hooks are engaged by the bar 23 said guide-posts limit the upward movement of the upper portion.

A guard 24 is secured upon the top of the case A over the sliding bars 7 and 23, and studs 25 project from said bars within said guard. Springs 26 are arranged within said guard and, in connection with said studs to hold said bars in their normal positions, respectively. A key 27 is provided to be inserted in the guard, which key is adapted to severally engage the studs 25, and thus actuate the bars 7 and 23.

Covers 28 and 29 are secured to the portions 1 and 2 of the holder and are of a size suited to cover that portion of the leaves B which extends external of the case A.

The leaves B have notches 30 in their edges to clear the pins 12 and 13 and are also perforated, so as to fit over the guide-posts 14.

In using my invention the portion of the holder 1 is removed by first shifting the bar 7 by means of the key, thus disengaging the arbors 5 from the pawls 4 and allowing the portion 1 to be lifted by the springs 11 until the arbors are withdrawn from the posts 3 and the sections 16 of the posts 14 are drawn up to their greatest extent. The bar 23 is then shifted by means of the key, and thereby the hooks 19 of the guide-posts 14 are disengaged, and said upper portion is thereby completely disconnected from the lower portion and may then be laid aside. A suitable number of leaves B are then placed in position upon the lower portion 2, the guide-posts 14 extending through their perforations 31 and their notches ranging against the sides of the pins 12. Plates 20 are then attached to the tops of the guide-posts 14 over the uppermost leaf, and the portion 1 is then replaced, the pawls 4 engaging the teeth of the arbors 5 as the said portion 1 is pressed firmly downward. At the same time the hooks 19 engage the bar 23. Thus the said leaves are held securely between the portions 1 and 2. It is not necessary to completely disconnect the upper portion 1 when it is desired to remove or insert but a few leaves, in which case the upper portion 1 may be raised sufficiently for such purpose by shifting the bar 7 only, leaving the hooks 19 in connection with the said upper portion. Thus said upper and lower portions will be parted to an extent limited by the posts 14. The leaves may then be removed or inserted in a manner which will be readily understood.

Having described my invention, what I claim as new, and desire to secure by Letters Patent, is—

1. In a loose-leaf book, a case consisting of an upper and a lower portion, one of said portions telescoping the other; locking mechanism in the ends of said portions to secure the same together; and vertically-adjustable guide-posts mounted upon said lower portion and having a locking connection with said upper portion whereby the vertical movement of said upper portion is limited.

2. In a loose-leaf book, a case consisting of an upper and a lower portion, one of said portions telescoping the other; locking mechanism in the ends of said portions to secure the same together; pins secured to said upper and lower portions adjacent said locking mechanism, the pins of the former portion intervening those of the latter; and vertically-adjustable guide-posts mounted upon said lower portion and having a locking connection with said upper portion whereby the vertical movement of said upper portion is limited.

In testimony whereof I affix my signature in presence of two witnesses.

WILLIAM E. JENKINSON.

Witnesses:
  W. G. BURNS,
  EMMA H. POPE.